US006966191B2

(12) United States Patent
Fukutani et al.

(10) Patent No.: US 6,966,191 B2
(45) Date of Patent: Nov. 22, 2005

(54) DEVICE FOR SUPPLYING SECONDARY AIR IN A GAS TURBINE ENGINE

(75) Inventors: Masayuki Fukutani, Wako (JP); Atsukuni Waragai, Wako (JP); Etsuo Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/844,604

(22) Filed: May 13, 2004

(65) Prior Publication Data

US 2005/0132706 A1 Jun. 23, 2005

(30) Foreign Application Priority Data

May 21, 2003 (JP) ............................. 2003-143116

(51) Int. Cl.[7] ................................................. F02C 7/06
(52) U.S. Cl. ....................................... 60/785; 60/39.08
(58) Field of Search .............................. 60/785, 39.08, 60/39.183, 782, 806

(56) References Cited

U.S. PATENT DOCUMENTS

2004/0112064 A1 * 6/2004 Friedl et al. ................. 60/806

FOREIGN PATENT DOCUMENTS

| GB | 1 398 456 | 6/1975 |
|---|---|---|
| GB | 2 111 607 | 7/1983 |
| GB | 2 366 334 | 3/2002 |
| GB | 2 374 638 | 10/2002 |
| WO | WO 98/28521 | 7/1998 |

* cited by examiner

Primary Examiner—Ehud Gartenberg
(74) Attorney, Agent, or Firm—Squire, Sanders & Dempsey LLP

(57) ABSTRACT

In a device for supplying secondary air in a gas turbine engine provided with an inner shaft (8) supporting a low pressure compressor and a low pressure turbine and a hollow outer shaft (7) coaxially nested with the inner shaft and supporting a high pressure compressor and a high pressure turbine, a seal air introduction passage (41, 45, 48) for introducing a part of high pressure air drawn from the high pressure compressor into a seal section provided in each of the bearing boxes is provided with a high pressure air introduction turbine (62) attached to the outer shaft in a rotationally fast manner. Owing to the use of the high pressure air introduction turbine, work is extracted from the seal air and cooling air derived from the supplied air and having a high temperature and high pressure air so that an excessive rise in the seal pressure at the normal rotational speed can be avoided and, at the same time, the supplied air can be reduced in temperature thereby avoiding an excessive rise in the temperature of the lubricating oil for the bearing.

16 Claims, 7 Drawing Sheets

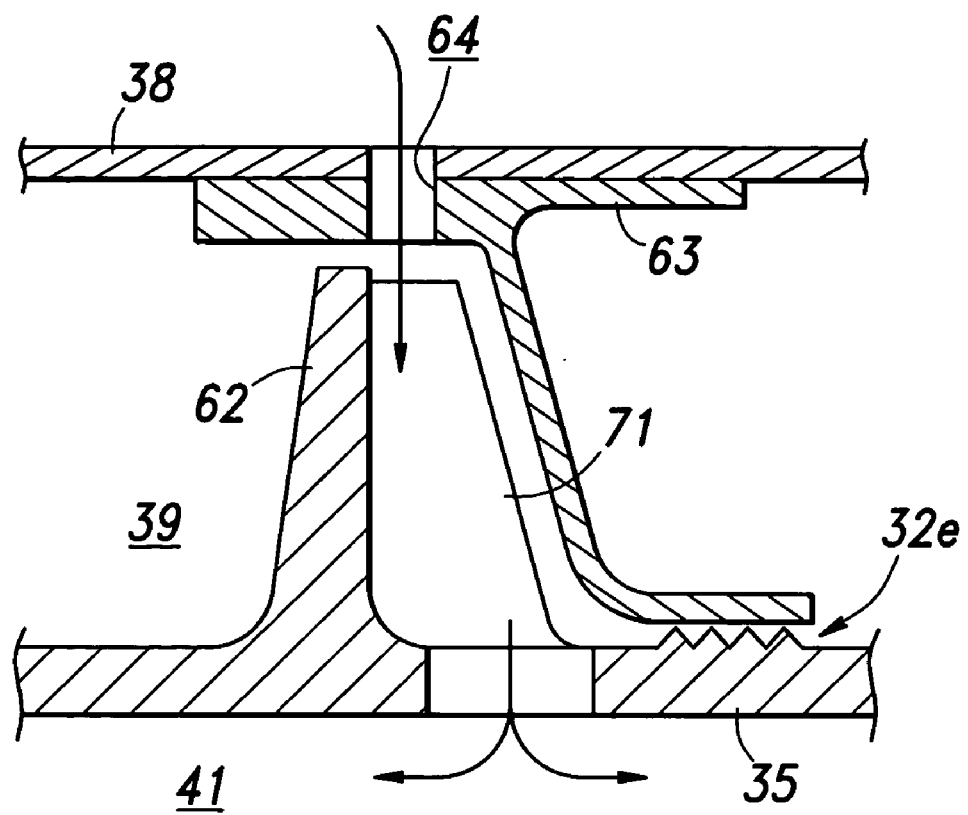

DEVICE FOR SUPPLYING SECONDARY AIR IN A GAS TURBINE ENGINE

TECHNICAL FIELD

The present invention relates to a device for supplying secondary air in a gas turbine engine.

BACKGROUND OF THE INVENTION

In a certain conventional gas turbine engine, an inner shaft supporting a low pressure compressor and a low pressure turbine and an outer shaft supporting a high pressure compressor and a high pressure turbine typically consist of hollow shafts which are coaxially nested with each other. Such a gas turbine engine is disclosed in the U.S. Pat. No. 5,862,666. According to the conventional gas turbine engine disclosed in this U.S. patent, the outer and inner shafts are supported by separate bearings at their front and rear ends, and each bearing is lubricated by a forced lubrication system which blows lubricating oil fed by a pump to the bearing.

In such a forced lubricating system, to positively prevent the lubricating oil from leaking out of the bearing boxes provided in the front and rear ends of the outer and inner shafts, high pressure air drawn from the compressor and whose pressure and flow rate are controlled by using an orifice or the like is conducted to the exterior of the oil seals of the bearing boxes as seal air to keep the interior of the bearing boxes at a lower pressure than the exterior thereof. Also, a part of the high pressure air is used for cooling the turbine rotor.

The air (secondary air) for cooling and sealing can be supplied by bleeding an intermediate stage or final stage of the compressor (CDP) depending on the user of the secondary air and required pressure. Alternatively, the bleed air for sucking a boundary layer may be used for this purpose. In case of a centrifugal compressor, air may be bled by directing the flow issuing from the outlet of an impeller into a gap between the back side of the impeller and casing.

However, the gas turbine engines that supply air for cooling and sealing as described above have the following problems.

(1) Because the high-pressure, high-temperature gas (secondary air) produced by the compressor is used for purposes other than providing a thrust, the overall efficiency of the engine is reduced.

(2) Because the pressure of the air compressed by the compressor is excessively high, the air needs to be reduced in pressure by using such means as an orifice, and this means a waste of usefully energy.

(3) When the high-temperature, high-pressure seal air is introduced into the bearing box, it causes the temperature of the lubricating oil to rise. This prevents adequate cooling of the lubricating oil, undesirably heats such components as the casing typically made of aluminum alloy and gears typically made of steel, and causes premature degradation of the lubricating oil. This creates the need for adding an oil cooler of a relatively large size and increasing the amount of the lubricating oil.

(4) High-temperature compressed air is not effective in cooling a turbine so that a correspondingly large amount of cooling air is required to be bled.

(5) When an orifice controls the pressure and flow rate of the seal air so as to ensure a required seal pressure at an idle rotational speed, the pressure of the seal air tends to be excessive at a normal operational rotational speed, and a large loss is incurred owing to an excessive bleeding.

(6) In case of a large compressor including a large number of stages, it is possible to bleed air of an appropriate temperature and pressure from an intermediate stage and minimize the loss by avoiding an excessive pressure. However, in case of small engines, in particular those using a centrifugal compressor, each stage compresses air by such a large factor that it is difficult to bleed air that has an appropriate pressure and temperature.

BRIEF SUMMARY OF THE INVENTION

In view of such problems of the prior art, a primary object of the present invention is to provide a device for supplying secondary air in a gas turbine engine which is free from at least part of such problems of the prior art.

A second object of the present invention is to provide a device for supplying secondary air in a gas turbine engine that demonstrates a high efficiency at a normal operating rotational speed and can avoid an excessive seal pressure (flow rate) while ensuring a suitable seal pressure even at an idle rotational speed.

A third object of the present invention is to provide a device for supplying secondary air in a gas turbine engine that can derive seal air of a desired quality while minimizing power loss due to the derivation of the seal air.

The present invention can achieve at least some of the foregoing object by providing a device for supplying secondary air in a gas turbine engine, comprising: an inner shaft connected to a low pressure compressor and a low pressure turbine; an outer shaft, coaxially disposed with respect to the inner shaft, connected to a high pressure compressor and a high pressure turbine; at least a pair of bearing boxes which are spaced from each other in an axial direction each accommodating a bearing for supporting an end of the inner or outer shaft; a seal air introduction passage for introducing a part of high pressure air drawn from the high pressure compressor into a seal section provided in each of the bearing boxes; and a high pressure air introduction turbine provided in the seal air introduction passage and attached to a part attached to the outer shaft in a rotationally fast manner.

Owing to the use of the high pressure air introduction turbine as a means for providing a seal pressure to the seal section of each bearing box, work is extracted from the seal air and cooling air, typically derived from a high pressure chamber defined downstream of a diffuser connected to a downstream end of the high pressure compressor and having a high temperature and high pressure by taking advantage of the action of the turbine at the normal operating rotational speed so that an excessive rise in the seal pressure at the normal rotational speed can be avoided and, at the same time, the supplied air having a high pressure and high temperature can be reduced in temperature thereby avoiding an excessive rise in the temperature of the lubricating oil for the bearing.

Typically, the high pressure compressor consists of a centrifugal compressor wheel. In such a case, the seal air introduction passage may comprise a gap defined between a back side of the centrifugal compressor wheel and an opposing surface of an opposing back plate, and the high pressure air introduction turbine may comprise a vane provided on the back side of the centrifugal compressor wheel. Preferably, the vane is adapted to deflect a swirl flow that flows from an outer periphery of the high pressure compressor to a back side thereof in a direction to cancel the swirl flow.

Thereby, the pressure and swirl components of the seal air can be suitably adjusted by supplying high pressure air from the outer periphery of the compressor wheel to the high pressure air introduction turbine and selecting the mixing ratio of the swirl flow from the back side of the high pressure compressor and the jet flow from the nozzles with each other so that the high pressure air is forwarded to the high pressure air introduction turbine at an appropriate incidence angle at the normal rotational speed.

The seal air introduction passage may comprise a radial air passage provided in a part attached to the outer shaft in a rotationally fast manner so as to permit a flow of seal air from an inner peripheral part thereof to an outer peripheral part thereof, and an outlet air flow from the radial air passage recedes with respect to a rotational direction of the outer shaft. Thereby, the radial air passage is prevented from functioning as a compressor with respect to the air flow that passes through the radial air passage in a radially outward direction. Thereby, the air is prevented from receiving work as it passes through the radial air passage and thereby being increased in temperature and pressure.

BRIEF DESCRIPTION OF THE DRAWINGS

Now the present invention is described in the following with reference to the appended drawings, in which:

FIG. 9 is an enlarged fragmentary sectional view showing another embodiment of the high pressure air introduction turbine.

DETAILED DESCRIPTION OF THE PREFERRED EMBODIMENTS

Figure 1:
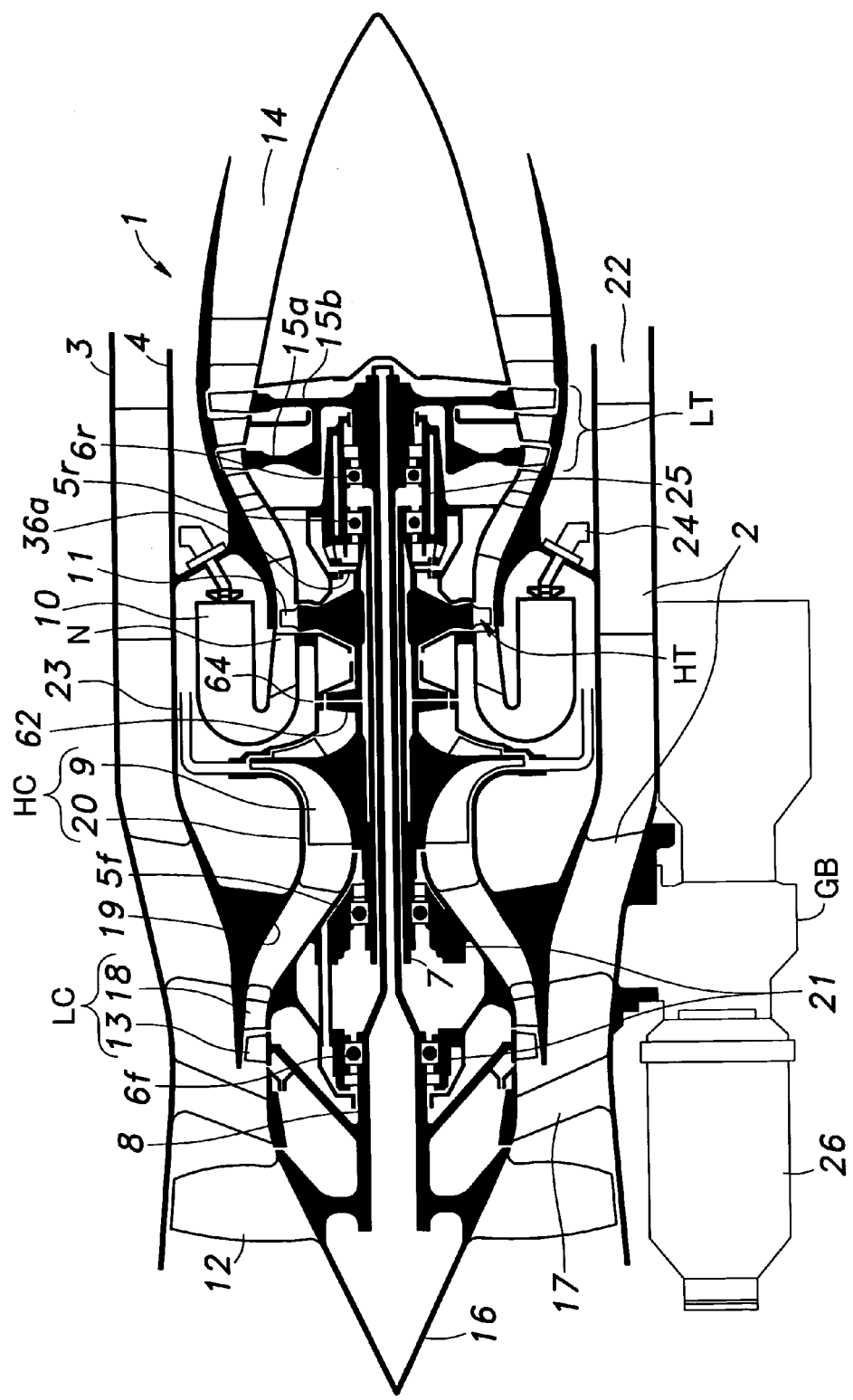
FIG. 1 is a schematic view of a jet engine embodying the present invention.

FIG. 1 is a schematic view of a multiple shaft bypass jet engine embodying the present invention. This engine 1 comprises an outer casing 3 and an inner casing 4 consisting of coaxially arranged cylindrical members joined to each other by struts 2, and an outer shaft 7 and an inner shaft 8 consisting of coaxially arranged hollow shafts centrally supported in the casings by independent bearings 5f, 5r, 6f and 6r.

The outer shaft 7 has a front end (left end in the drawing) integrally carrying an impeller wheel 9 of a high pressure centrifugal compressor HC, and a rear end (right end in the drawing) integrally carrying a high pressure turbine wheel 11 of a high pressure turbine HT provided adjacent to nozzles N of counter-flow combustion chambers 10.

The inner shaft 8 has a front end integrally carrying a front fan 12 and a compressor wheel 13 supporting rotor vanes for a low pressure axial flow compressor LC immediately behind the front fan 12, and a rear end integrally carrying a pair of turbine wheels 15a and 15b including rotor vanes placed in a combustion gas flow in a jet duct 14 so as to form a low pressure turbine LT.

A nose cone 16 is centrally provided on the front fan 12, and stator vanes 17 are provided behind the nose cone 16 with their outer ends attached to the inner circumferential surface of the outer casing 3.

Stator vanes 18 of the low pressure axial flow compressor LC are disposed on the inner circumferential surface of a front end portion of the inner casing 4. Behind the stator vanes 18 are provided an intake duct 19 for conducting the air drawn by the front fan 12 and pre-compressed by the low pressure axial flow compressor LC to the high pressure centrifugal compressor HC, and an impeller casing 20 of the high pressure centrifugal compressor HC disposed immediately downstream of the intake duct 19. The inner peripheral part of the intake duct 19 is integrally provided with a front bearing box 21 for the bearings 5f and 6f which support the front ends of the outer shaft 7 and inner shaft 8, respectively.

The air drawn by the front fan 12 is in part forwarded to the high pressure centrifugal compressor HC via the low pressure axial flow compressor LC as mentioned earlier, and the remaining larger amount of air having a relatively low velocity is expelled rearward through a bypass duct 22 defined between the outer casing 3 and inner casing 4 to provide a primary thrust in the low speed range.

To the outer periphery of the high pressure centrifugal compressor HC is connected a diffuser 23 so as to provide a high pressure air to the counter-flow combustion chambers 10 provided downstream of the diffuser 23. In each of the counter-flow combustion chambers 10 provided immediately downstream of the diffuser 23, the fuel ejected from a fuel injection nozzle 24 provided on the rear end of the combustion chamber 10 is mixed with the high pressure air supplied from the diffuser 23, and is combusted. The combustion gas which is expelled from the nozzle N of each combustion chamber 10 is ejected to the atmosphere via the jet duct 14, and provides a primary thrust in the high speed range.

The inner peripheral part of the jet duct 14 is integrally provided with a rear bearing box 25 for the bearings 5r and 6r which support the rear ends of the outer shaft 7 and inner shaft 8, respectively.

The outer shaft 7 of the engine 1 is connected to an output shaft of a starter motor 26 via a gear mechanism not shown in the drawings. As the starter motor 26 is activated, the impeller wheel 9 of the high pressure centrifugal compressor HC is driven, along with the outer shaft 7, and this causes high pressure air to be supplied to the counter-flow combustion chambers 10. When fuel mixed with this high pressure air combusts, the resulting pressure of the combustion gas drives the turbine wheel 11 of the high pressure turbine HT and the turbine wheels 15a and 15b of the low pressure turbine LT. The rotational power of the high pressure turbine wheel 11 drives the impeller wheel 9 of the high pressure centrifugal compressor HC, and the rotational power of the turbine wheels 15a and 15b of the low pressure turbine LT drives the compressor wheel 13 of the low pressure axial flow compressor LC. As the high pressure turbine wheel 9 and low pressure turbines 15a and 15b are driven by the jet pressure of the combustion gas, the engine I continues its rotation according to a negative feedback balance between the amount of fuel supply and the amount of intake air (at the normal operating rotational speed).

Figure 2:
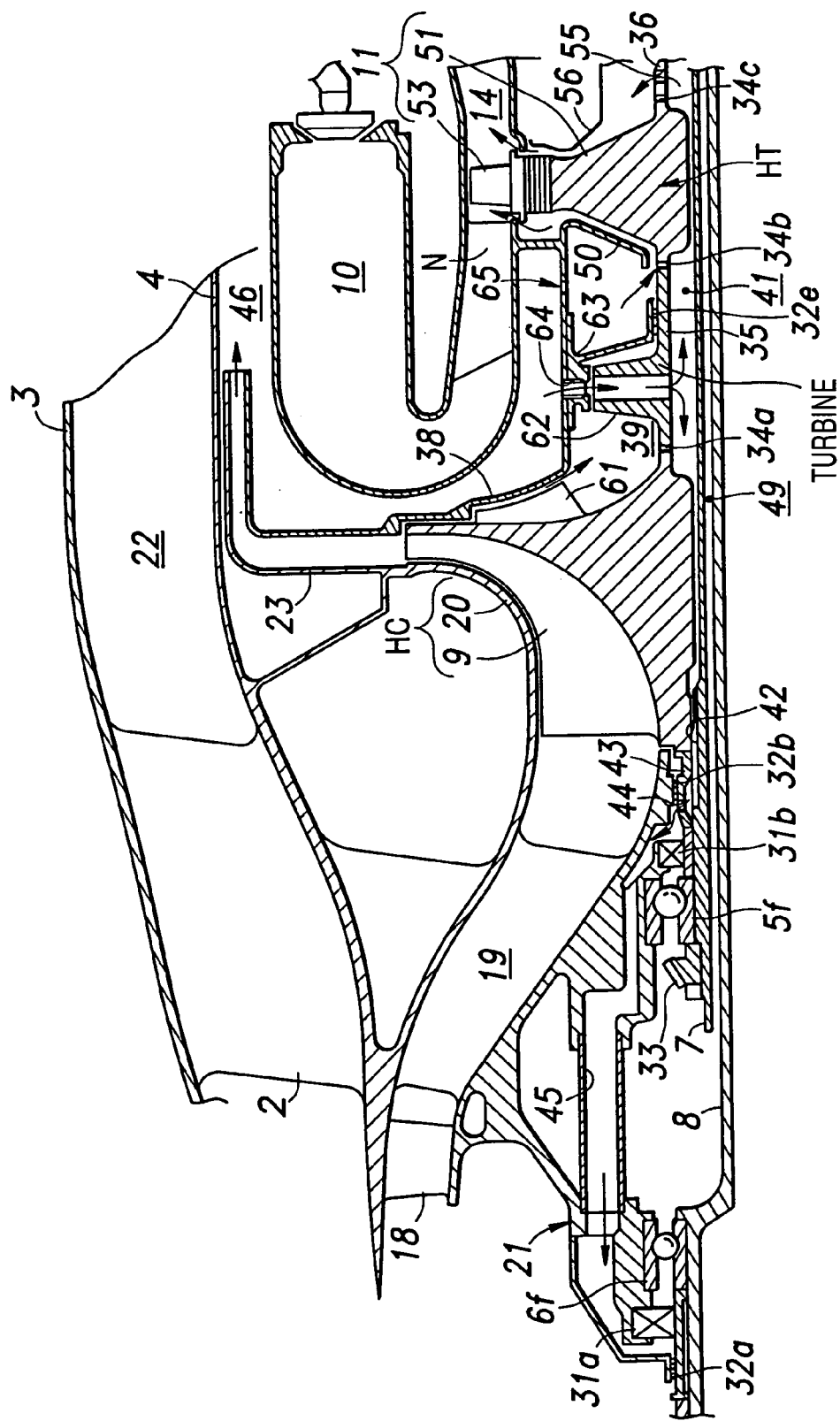
FIG. 2 is an enlarged fragmentary sectional view of the high pressure compressor and high pressure turbine of the jet engine shown in FIG. 1.
Figure 3:
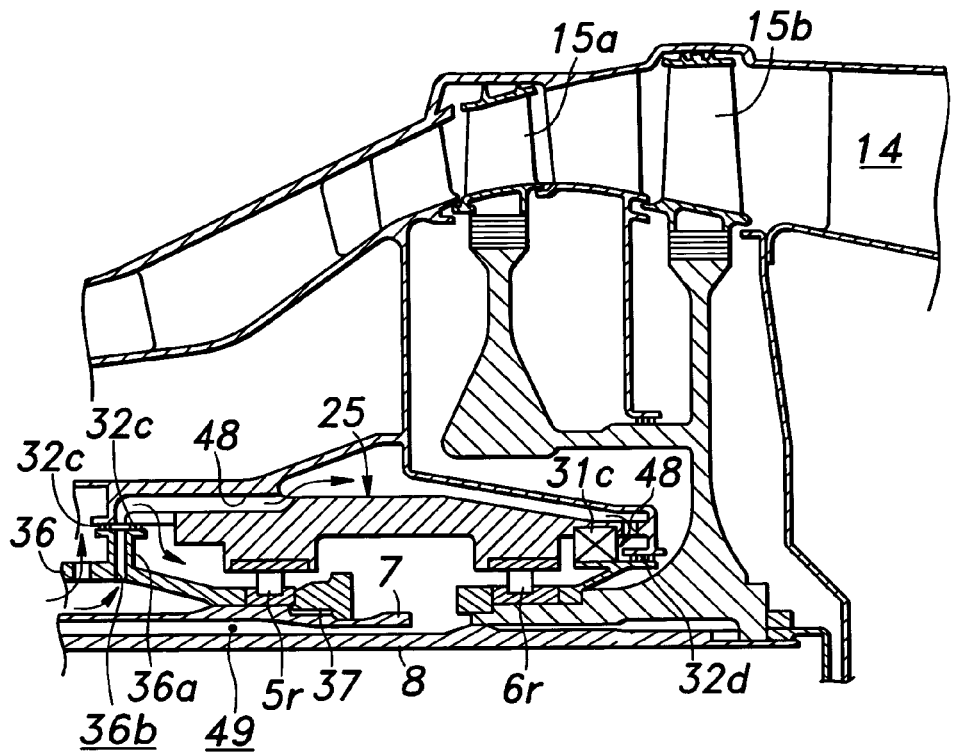
FIG. 3 is an enlarged fragmentary sectional view of the low pressure turbine of the jet engine shown in FIG. 1.

As illustrated in FIG. 2 in greater detail, support parts for the bearing 5f supporting the front end of the outer shaft 7 and the bearing 6f supporting the front end of the inner shaft 8 are provided in the front bearing box 21 at a certain distance from each other in the axial direction. As illustrated in FIG. 3 in greater detail, support parts for the bearing 5r supporting the rear end of the outer shaft 7 and the bearing 6r supporting the rear end of the inner shaft 8 are provided in the rear bearing box 25 at a certain distance from each other in the axial direction.

Floating ring seals 31a and 31b are provided ahead of the front bearing 6f of the inner shaft 8 and behind the front bearing 5f of the outer shaft 7, respectively, in the front bearing box 21, and floating ring seals 31c and 31d are provided ahead of the rear bearing 5r of the outer shaft 7 and behind the rear bearing 6r of the inner shaft 8, respectively, in the rear bearing box 25, to prevent the lubricating oil supplied to the various bearings from leaking out of the bearing boxes 21 and 25. Labyrinth seals 32a to 32d are provided between the front and rear ends of the bearing boxes 21 and 25 and the opposing outer circumferential surfaces of the inner and outer shafts 7 and 8, respectively.

The front end of the outer shaft 7 is connected to the inner race of the front bearing 5f and a bevel gear 33 for the starter motor, and fits into an axially front end of the impeller wheel 9 via a spline coupling. A front central shaft end of the turbine wheel 11 is connected to the axial center of the back side of the impeller wheel 9 via a hollow connecting shaft 35 having CURVIC (tradename) couplings 34a and 34b on either axial end thereof. The axial center of the back side of the turbine wheel 11 is connected to a collar 36 fitted with a labyrinth seal 32c adjacent to a bearing portion on the rear end of the outer shaft 7 via a CURVIC coupling 34c.

The impeller wheel 9, hollow connecting shaft 35, turbine wheel 11, collar 36 and inner race of the bearing 5r on the rear end of the out shaft 7 are fitted onto the outer shaft 7, in this order, and a bearing nut 37 threaded onto the outer shaft 7 applies a prescribed initial tension to the outer shaft 7.

Figure 4:
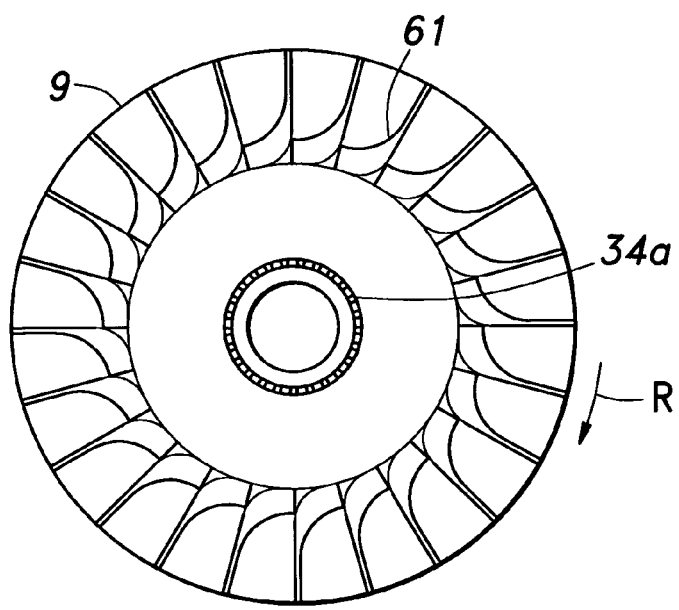
FIG. 4 is a view showing the back side of the high pressure compressor.

Behind the impeller wheel 9 is defined an impeller back chamber 39 by a back plate 38, and the output pressure of the high pressure centrifugal compressor HC prevails in the impeller back chamber 39. As shown in FIG. 4 in greater detail, a plurality of vanes 61 that extend radially at a slight angle with respect to the radial direction are provided on the back side of the impeller wheel 9. These vanes 61 are each tilted at its leading edge toward the rotational direction (indicated by an arrow R in the drawing) so that the rotational flow (free vortices) introduced inwardly from an outer periphery of the impeller wheel 9 is directed in a direction (backward direction) to cancel the rotational components of the vortices. Therefore, the rotational flow flowing into the impeller back chamber 39 under the action of the output pressure of the impeller wheel 9 feeds its energy back to the impeller wheel 9 serving as a turbine in this case.

Figure 5:
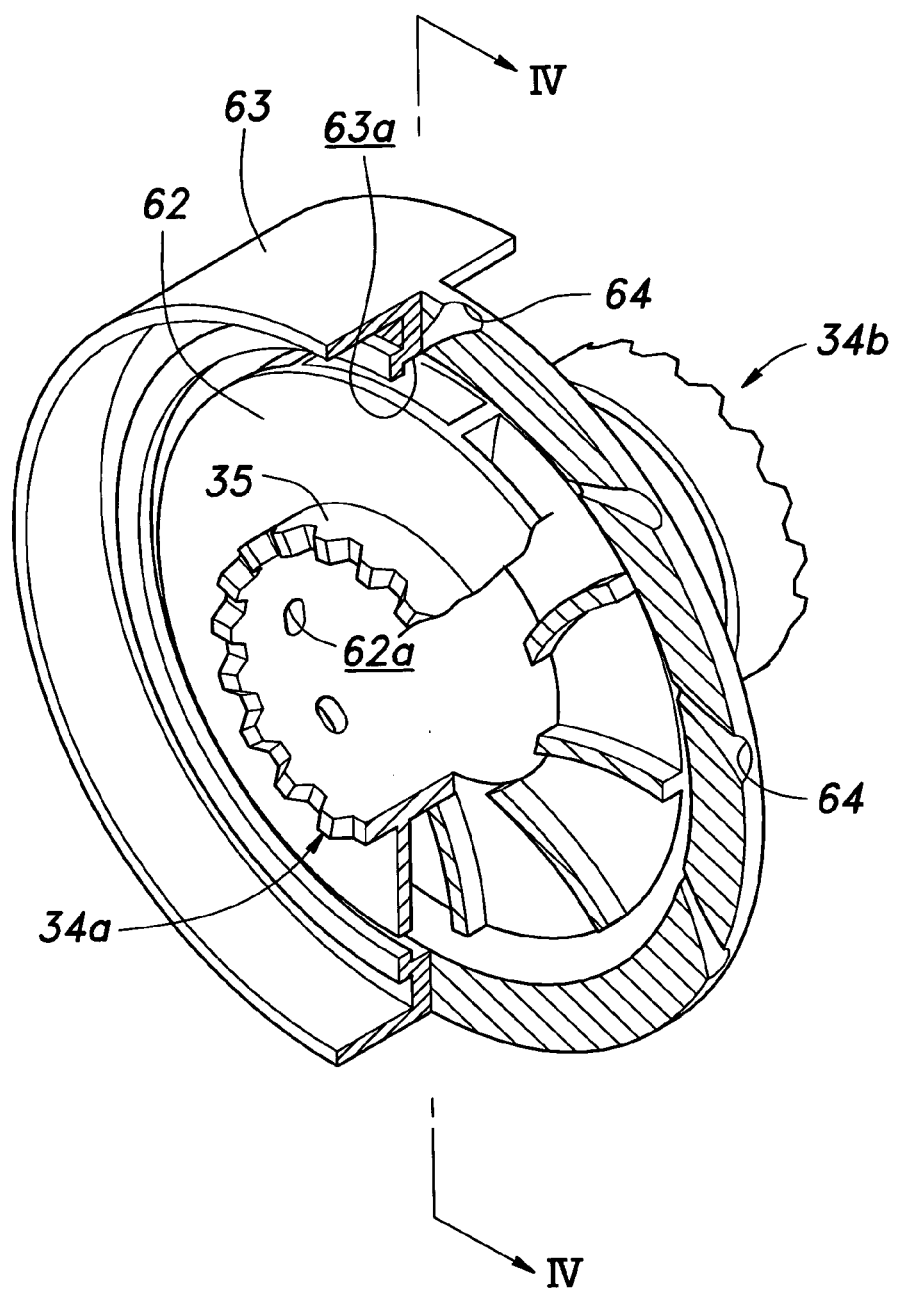
FIG. 5 is a fragmentary, partly broken away perspective view of the high pressure air introduction turbine and nozzles.
Figure 6:
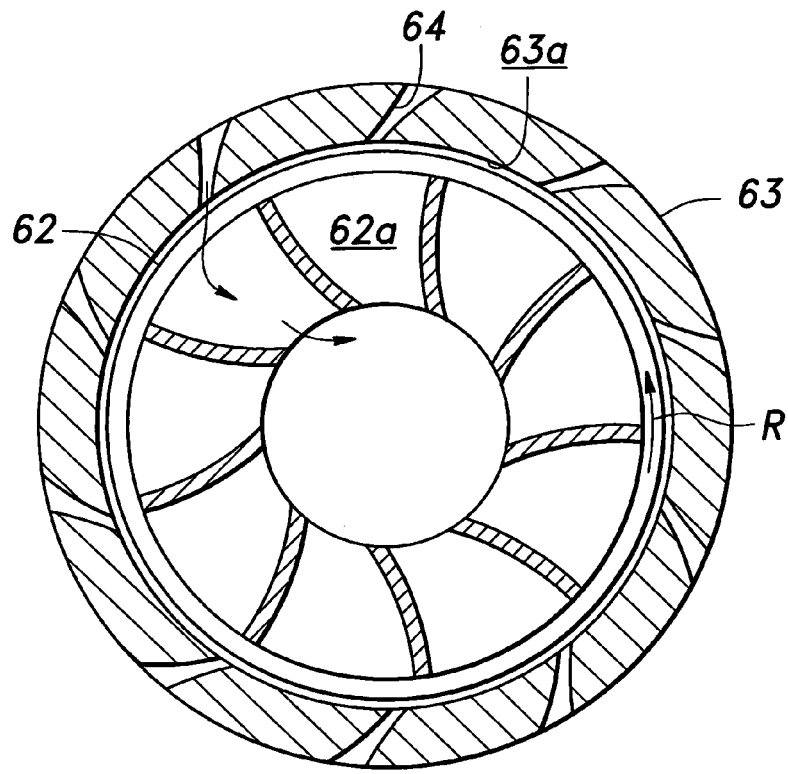
FIG. 6 is a sectional view take along line VI—VI of FIG. 5.

As also shown in FIG. 5, the hollow connecting shaft 35 is provided with a high pressure air introduction turbine 62 provided with radial introduction passages. Inside the high pressure air introduction turbine 62 are provided a plurality of air passages 62a extending radially between the inner circumferential surface of the hollow connecting shaft 35 and the outer circumferential surface of a flange portion on an outer periphery thereof. In the illustrated embodiment, the air passages 62a are defined between a pair of circular wall members of a turbine wheel of the high pressure air introduction turbine 62. As shown in FIG. 6, the air passages 62a are formed in such a manner that the air flow is deflected in the opposite direction to the rotational direction of the high pressure air introduction turbine 62 (indicated by an arrow R in the drawing). Thus, the high pressure air introduction turbine 62 is formed as a radial turbine (or, alternatively, as an axial turbine) and provides both seal air and cooling air by extracting energy from the supplied air. The high pressure air introduction turbine 62 is provided in addition to the vanes 61 in the illustrated embodiment, but even the high pressure air introduction turbine 62 alone may be able to provided an adequate result so that the vanes 61 may not be absolutely necessary.

It is also possible to provide vanes 71 similar to the vanes 61 between the high pressure air introduction turbine 62 and a circumferentially extending annular member 63 as illustrated in FIG. 9 to increase the load of the turbine. In this case, the radial air passages 62a of the high pressure air radial turbine 62 is defined between a wall member of a turbine wheel and an opposing stationary wall member.

An extension of the back plate 38 extends around the outer periphery of the high pressure air introduction turbine 62, and the circumferentially extending annular member 63 is fixedly attached to the inner circumferential surface of the back plate 38 so as to oppose the high pressure air introduction turbine 62 with a certain gap. The circumferentially extending annular member 63 is provided with a plurality of nozzles 64 tapering toward the high pressure air introduction turbine 62 and arranged circumferentially at a regular interval to blow the high pressure air from the high pressure chamber 46 containing the counter-flow combustion chambers 46 to the high pressure air introduction turbine 62. The nozzles 64 provided in the back plate (partition wall) 38 serves as flow adjusting orifices and the air flow from the nozzles 64 are directed in the rotational direction of the high pressure air introduction turbine 62 (the arrow R in the drawing) as shown in FIG. 6. The inner circumferential surface of the circumferentially extending annular member 63 is provided with a circumferential groove 63a to thereby define a turbine inlet space.

A gap 41 is defined between the inner circumferential surface of a sleeve member provided on the axial center of the impeller wheel 9 (or the hollow connecting shaft 35) and outer circumferential surface of the outer shaft 7 to serve as a first passage or seal air introduction passage, and the air passage 62a of the high pressure air introduction turbine 62 opens into the gap 41. The gap 41 communicates with the impeller back chamber 39 defined between the back surface of the impeller wheel 9 and back plate 38 via the air passages 62a. A part of the circumferentially extending annular member 63 extends to the axial end of the high pressure air introduction turbine 62 facing away from the high pressure compressor HC, and a labyrinth seal 32e is provided between these two parts.

Therefore, the swirl flow flowing into the impeller chamber 39 from the outer periphery of the impeller wheel 9 can flow into the gap 41 from the gap between the high pressure air introduction turbine 62 and circumferentially extending annular member 63 via the air passages 62a. This forms seal air introduction passage.

As illustrated in FIG. 2, the spline coupling part of the impeller wheel 9 is provided with axial grooves 42, and the collar 43 fitted with the labyrinth seal 32b at the front end of the central shaft of the impeller wheel 9 is provided with an orifice 44 which communicates the spline coupling part with the interior of an inner rear part of the front bearing box 21.

A plurality of passages 45 serving as a second passage communicating a front part of the bearing box 21 with a rear part thereof are provided at a regular interval along a circle. The combined cross sectional area of the passages 45 is sufficiently greater than the cross sectional area of the orifice 44 which was mentioned earlier.

In this gas turbine engine, the high pressure air compressed by the high pressure centrifugal compressor HC in most part flows into a high pressure chamber 46 accommodating the counter-flow combustion chambers 10, via the diffuser 23, and the remaining part of the high pressure air flows into the impeller back chamber 39 from the outer periphery of the impeller wheel 9. The high pressure air then flows into the gap 41 communicating with a clearance defined between the inner circumferential surface of the axial center of the impeller wheel 9 and the outer circumferential surface of the outer shaft 7.

The high pressure air that has reached the gap 41 then flows into a part at which the floating ring seal 31b is mounted behind the outer shaft support bearing 5f of the front bearing box 21 supporting the front end portion of the outer shaft 7 in the front bearing box 21. Thereafter, the high pressure air reaches a part at which the floating ring seal 31a is mounted in front of the inner shaft support bearing 6f supporting the front end portion of the inner shaft 8 in the front bearing box 21, via the passages 45 communicating the front and rear parts of the front bearing box 21 to each other.

The high pressure air that has flown into the part at which the floating ring seals 31a and 31b are attached ahead of and behind the front bearing box 21, respectively, maintains the external pressure higher than the internal pressure so that the lubricating oil in the front bearing box 21 is prevented from leaking out. This seal pressure is sealed off by the labyrinth seals 32a and 32b.

The back plate 38 serving as a partition wall separating the impeller back chamber 39 from the high pressure chamber 46 is provided with the nozzles 64 as mentioned earlier so that high pressure air is supplied from the high pressure chamber 46 to the impeller back chamber 39. As these nozzles 64 serve as metering orifices as discussed earlier, by suitably selecting the configuration of the nozzles 64, the inner pressure of the impeller back chamber 39 that has a significant influence on the pressure balance of the shafts as a whole can be maintained at an appropriate level.

By thus providing the high pressure air introduction turbine 62, when supplying the high pressure, high temperature air (secondary air) pressurized by the high pressure centrifugal compressor HC into the bearing box 21 as seal air, work (kinetic energy) is obtained from the secondary air by virtue of the high pressure air introduction turbine 62 so that the temperature of the supplied secondary air can be reduced. Thereby, the cooling of the lubricating oil in the bearing box 21 can be enhanced, and such ill effects an excessive rise in temperature of the aluminum case and steel gear members and premature degradation of the lubricating oil can be avoided. As a result, the need for a large oil cooler or an increased amount of lubricating oil can be eliminated, and the cost of the gas turbine engine can be reduced.

The flow property of the high pressure air introduction turbine 62 can be appropriately selected by suitably designing the configuration of the flow passages 62a. Thus, a maximum amount of work can be produced in an efficient manner at the normal rotational speed of the gas turbine engine and a required seal pressure can be obtained at the idle rotational speed (off-design) while avoiding an excessive seal pressure (flow rate) under all other rotational speed ranges.

The swirl flow (free vortices) flowing from the outer periphery of the impeller wheel 9 into the impeller back chamber 39 is passed through the passages between the turbine vanes 61 provided on the back surface of the impeller wheel 9 so as to recover part of energy therefrom, and is then allowed to flow into the air passages 62a. The high pressure air of the high pressure chamber 46 is blown in the rotational direction of the high pressure air introduction turbine 62, and is mixed with the swirl flow before the combined air flow is introduced into the air passages 62a. By appropriately controlling the mixing ratio of the air flow from the two sources, the pressure and swirl component of the high pressure air flowing into the air passages 62a can be controlled in such a manner that the direction of the flow of the high pressure air that flows into the high pressure air introduction turbine 62 is given with an appropriate incidence angle with respect to the air passages 62a of the high pressure air introduction turbine 62 at the normal rotational speed.

The foregoing description covered only the supply passage for the seal air for the front bearing box 21, but a similar arrangement can be applied to the rear bearing box 25 also. In this case, as shown in FIG. 3, a radially outwardly directed flange portion 36a having a T-shaped cross section may be integrally formed with the collar 36 in front of the rear bearing 5f supporting the rear end portion of the outer shaft 7, and may be formed with air passages 36b. The two legs of the flange portion 36a may be each provided with a labyrinth seal 32c. By opening out the air passages 36b in the space defined between the two labyrinth seals 32c, a gap defined between the inner circumferential surface of the collar 36 and outer circumferential surface of the outer shaft 7 can be communicated with the space defined between the two labyrinth seals 32c. A passage 48 that communicates with a space defined between a floating ring seal 31c provided to the rear of the rear bearing box 6r supporting the rear end portion of the inner shaft 8 and an adjacent labyrinth 32d may be provided in a suitable part of the rear bearing box 25.

The interior of the front bearing box 21 communicates with the interior of the rear bearing box 25 via a gap 49 defined between the inner circumferential surface of the outer shaft 7 and the outer circumferential surface of the inner shaft 8 so that a part of the lubricating oil which has lubricated the bearings 5f, 5r, 6f and 6r and the seal air which has passed through the labyrinth seal 32c and floating ring seal 31c are allowed to flow into the front gear box 21 via the gap 49. The lubricating oil and seal air are then drawn into the gear box GB connected to the starter motor 26 via a drain hole (not shown in the drawings) provided along the length of the shaft of the drive bevel gear meshing with the bevel gear 33 fixed on an end of the outer shaft 7, and is expelled to the atmosphere via the bypass duct 22 while the lubricating oil is separated by an oil separator (not shown in the drawings) provided in the gear box GB.

A part of the high pressure air introduced into the high pressure chamber 46 is metered by an orifice 65 provided in the partition wall 38, and is guided by a shroud 50 placed opposite the front surface of the turbine wheel 11 of the high pressure turbine HT as it flows along the front surface of the disk portion 51 of the turbine wheel 11. Turbine blades 53 are connected to the peripheral part of the disk portion 51 of the turbine wheel 11, and the aforementioned air flow cools the front face of the portions connecting the turbine blades 53 to the disk portion 51.

The collar 36 is provided with radial slots 55 so that the high pressure air which has passed into the hollow connecting shaft 35 and the gap 41 between the outer circumferential surface of the outer shaft 7 and the inner circumferential surface of the axial center of the high pressure turbine HT blows rearwardly across the central bore of the turbine wheel 11 of the high pressure turbine HT. Thus, the backside of the connecting portion between the disk portion 51 and turbine blades 53 is also cooled. The air which has cooled the connecting parts between the disk portion 51 and turbine blades 53 is guided by the shrouds 50 and 56 opposing the front and rear sides of the disk portion 51, and is ejected from the jet duct 14 drawn by the combustion gas ejected from the nozzles N of the counter-flow combustion chambers 10.

Figure 8:
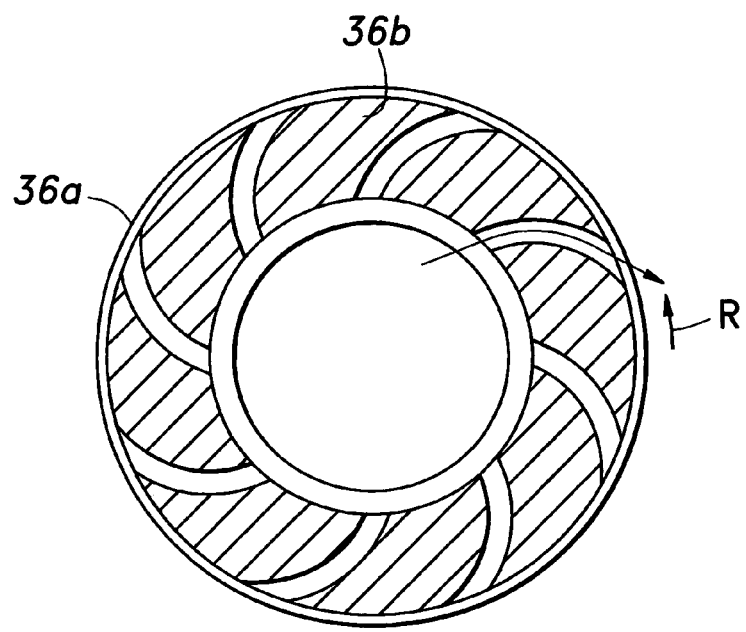
FIG. 8 is a sectional view take along line VIII—VIII of FIG. 7.
Figure 7:
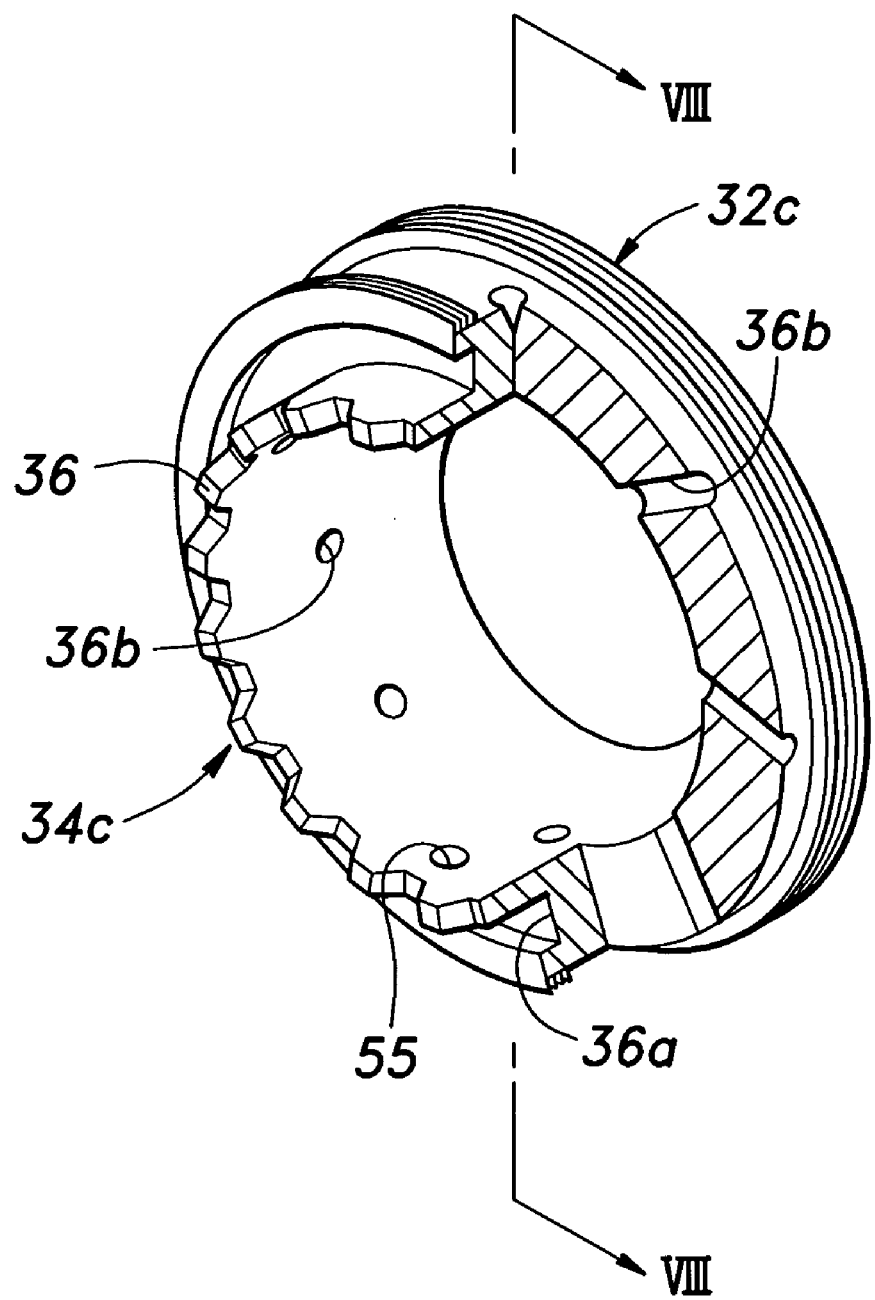
FIG. 7 is a fragmentary, partly broken away perspective view of the radial flange portion provided in the collar.

As also shown in FIGS. 7 and 8, the air passages 36b provided in the flange portion 36a communicate the inner circumferential surface of the collar 36 with the space between the two labyrinth seals 32c and are plural in number. Therefore, the gap defined between the inner circumferential surface of the collar 36 and outer circumferential surface of the outer shaft 7 communicates with the gap 41 via the clearance between the inner circumferential surface of the disk portion 51 of the turbine wheel 11 and outer circumferential surface of the outer shaft 7.

The front portion of the rear bearing box 25 opposes the two legs of the flange portion 36a, and are each provided with a labyrinth seal 32c. The back plate (shroud 56) that opposes the back side of the disk portion 51 of the turbine wheel 11 extends from the rear bearing box 24.

The high pressure air in the gap 41 flows into the passage 48 via the air passages 36b, and reaches the floating ring seal 31c of the rear bearing 6r guided by the passage 48.

The air passages 36b provided in the flange portion 36a extend radially with respect to the axial center of the collar 36, and tilt rearward or recede at the outer periphery thereof with respect to the rotational direction of the collar 36 (indicated by the arrow R) as shown in FIG. 8. Owing to the backward tilting of the air passages 36b with respect to the rotational direction, the air passages 36b are prevented from functioning as a compressor with respect to the air that passes through the air passages 36b in a radially outward direction.

For this reason, the air that flows through the air passages 36b from the inner periphery of the flange portion 36 to the outer periphery thereof is prevented from receiving work as it passes through the air passages 36 serving as orifices so that the temperature and pressure of the air are prevented from rising. As a result, the seal air that was reduced in temperature as it passes through the high pressure air introduction turbine 62 can be used without its temperature being raised once again. At the same time, an excessive rise in the pressure of the seal air at a high rotational speed can be controlled and the vent and oil consumption at the normal rotational speed can be minimized. The air passages 36b may be given with a certain curvature by electrical discharge machining or the like. By so doing, stress concentration in the inner peripheral part can be avoided, and the air passages may be formed so as to have a desired deflection angle.

Thus, according to the illustrated embodiment, owing to the desirable action of the high pressure air introduction turbine, an excessive rise in the seal pressure at the normal rotational speed can be controlled. At the same time, the temperature and pressure of the air that were raised by the high pressure compressor can be reduced so that the rise in the temperature of the lubricating oil for the bearings can be controlled. In particular, the pressure and swirl components of the seal air can be suitably adjusted by supplying high pressure air to the high pressure air introduction turbine and selecting the mixing ratio of the swirl flow from the back side of the high pressure compressor and the jet flow from the nozzles for the high pressure air introduction turbine so that the high pressure air is forwarded to the high pressure air introduction turbine at an appropriate incidence angle at the normal rotational speed. Therefore, seal air and cooling air having an appropriate pressure and temperature can be introduced. By providing vanes on the back side of the centrifugal compressor, energy can be extracted from the swirl flow (free vortices) that flows from the outer periphery of the centrifugal compressor into the back side thereof so as to contribute to the supply of seal air and cooling air having an appropriate pressure and temperature.

By supplying the seal air to the bearing box via the radial air passages provided in the outer shaft and tilting the air passages so as to be directed backward with respect to the rotational direction, the air is prevented from receiving work as it passed through the air passages and thereby being increased in temperature and pressure. Therefore, the seal air which is reduced in temperature as it passes through the high pressure air introduction turbine can be used without being increased in temperature. At the same time, an excessive rise in the seal pressure at a high rotational speed can be avoided, and the vent and oil consumption at the normal rotational speed can be minimized.

Although the present invention has been described in terms of a preferred embodiment thereof, it is obvious to a person skilled in the art that various alterations and modifications are possible without departing from the scope of the present invention which is set forth in the appended claims.

What is claimed is:

1. A device for supplying secondary air in a gas turbine engine, comprising:
   an inner shaft (8) connected to a low pressure compressor (LC) and a low pressure turbine (LT);
   an outer shaft (7), coaxially disposed with respect to the inner shaft, connected to a high pressure compressor (HC) and a high pressure turbine (HT);
   at least a pair of bearing boxes (21, 25) which are spaced from each other in an axial direction each accommodating a bearing (5f, 5r, 6f, 6r) for supporting an end of the inner or outer shaft;
   a seal air introduction passage (41, 45, 48) for introducing a part of high pressure air drawn from the high pressure compressor into a seal section provided in each of the bearing boxes; and
   a high pressure air introduction turbine (62) provided in the seal air introduction passage and attached to a part attached to the outer shaft in a rotationally fast manner.

2. A device for supplying secondary air in a gas turbine engine according to claim 1, wherein the high pressure air is derived from a high pressure chamber (46) defined downstream of a diffuser (23) connected to a downstream end of the high pressure compressor.

3. A device for supplying secondary air in a gas turbine engine according to claim 2, wherein the high pressure compressor comprises a centrifugal compressor wheel (9).

4. A device for supplying secondary air in a gas turbine engine according to claim 3, wherein the seal air introduction passage comprises a gap defined between a back side of the centrifugal compressor wheel and an opposing surface of an opposing back plate (38), and the high pressure air introduction turbine comprises a vane (61) provided on the back side of the centrifugal compressor wheel.

5. A device for supplying secondary air in a gas turbine engine according to claim 4, wherein the vane is adapted to deflect a swirl flow that flows from an outer periphery of the centrifugal compressor wheel to a back side thereof in a direction to cancel the swirl flow.

6. A device for supplying secondary air in a gas turbine engine according to claim 2, wherein the seal air introduction passage comprises an orifice (64) provided in a partition wall (38) defining the high pressure chamber (46) for communication with an inlet end of the high pressure air introduction turbine, and the high pressure air introduction turbine comprises a radial turbine provided in the part attached to the outer shaft in a rotationally fast manner.

7. A device for supplying secondary air in a gas turbine engine according to claim 6, wherein the seal air introduction passage comprises a gap (41) defined between an inner surface of the part attached to the outer shaft (7) in a rotationally fast manner and an outer surface of the outer shaft, and the high pressure air radial turbine is provided with a radial air passage (62*a*) passed radially across the part attached to the outer shaft in a rotationally fast manner.

8. A device for supplying secondary air in a gas turbine engine according to claim 6, wherein the orifice is formed as a nozzle adapted to direct an air flow in a rotational direction of the high pressure air introduction turbine.

9. A device for supplying secondary air in a gas turbine engine according to claim 6, wherein an outlet of an air flow from the radial air passage opposes the rotational direction of the outer shaft.

10. A device for supplying secondary air in a gas turbine engine according to claim 6, wherein the high pressure compressor comprises a centrifugal compressor wheel.

11. A device for supplying secondary air in a gas turbine engine according to claim 10, wherein the seal air introduction passage further comprises a gap defined between a back side of the centrifugal compressor wheel and an opposing surface of an opposing back plate (38), and the high pressure air introduction turbine further comprises a vane provided on the back side of the centrifugal compressor wheel.

12. A device for supplying secondary air in a gas turbine engine according to claim 11, wherein the vane is adapted to deflect a swirl flow that flows from an outer periphery of the centrifugal compressor wheel to a back side thereof in a direction to cancel the swirl flow.

13. A device for supplying secondary air in a gas turbine engine according to claim 6, wherein the radial air passage of the high pressure air radial turbine is defined between a pair of opposing wall members of a turbine wheel.

14. A device for supplying secondary air in a gas turbine engine according to claim 6, wherein the radial air passage of the high pressure air radial turbine is defined between a wall member of a turbine wheel and an opposing stationary wall member.

15. A device for supplying secondary air in a gas turbine engine according to claim 6, wherein the part attached to the outer shaft in a rotationally fast manner comprises a hollow connecting shaft (35) connected between an impeller for the high pressure compressor and a turbine wheel of the high pressure turbine via a coupling arrangement (34*a*, 34*b*).

16. A device for supplying secondary air in a gas turbine engine according to claim 1, wherein the seal air introduction passage comprises a radial air passage (36*b*) provided in a part attached to the outer shaft (7) in a rotationally fast manner so as to permit a flow of seal air from an inner peripheral part thereof to an outer peripheral part thereof, and an outlet air flow from the radial air passage recedes with respect to a rotational direction of the outer shaft.

* * * * *